Figure 1:
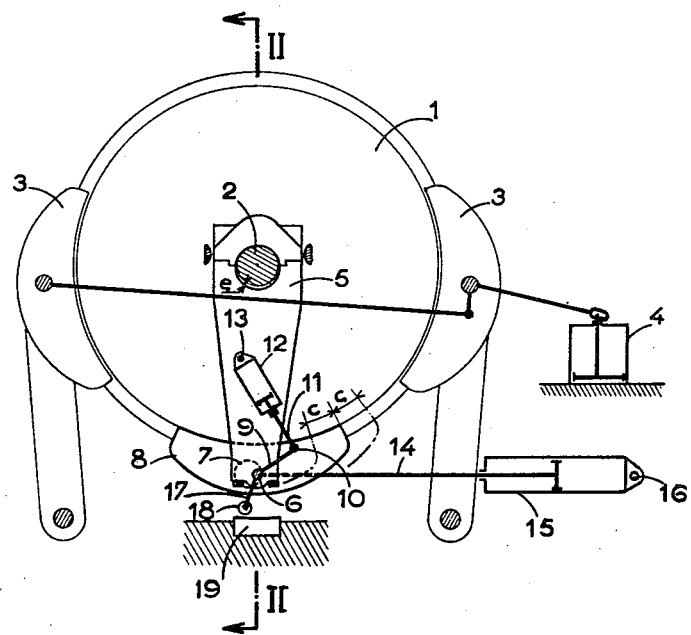

Aug. 28, 1962 M. BONZON 3,051,266
AUXILIARY ELEVATOR BRAKE FOR ADJUSTMENT OF GAGE LEVEL
Filed June 27, 1960 4 Sheets-Sheet 1

Aug. 28, 1962 M. BONZON 3,051,266
AUXILIARY ELEVATOR BRAKE FOR ADJUSTMENT OF GAGE LEVEL
Filed June 27, 1960 4 Sheets-Sheet 2

Aug. 28, 1962  M. BONZON  3,051,266
AUXILIARY ELEVATOR BRAKE FOR ADJUSTMENT OF GAGE LEVEL
Filed June 27, 1960  4 Sheets-Sheet 4

# United States Patent Office 3,051,266
Patented Aug. 28, 1962

3,051,266
AUXILIARY ELEVATOR BRAKE FOR ADJUSTMENT OF CAGE LEVEL
Maurice Bonzon, Le Creusot, France, assignor to Societe des Forges et Ateliers du Creusot, Paris, France, a French company
Filed June 27, 1960, Ser. No. 39,125
Claims priority, application France July 3, 1959
8 Claims. (Cl. 187—28)

This invention relates to mine hoisting systems, and more especially to hoisting systems using Koepe drive pulleys. When a pit-cage is positioned at one of the lower levels of a deep mine-pit, the bearing rope is apt to undergo considerable variations in length due to stretching. As a result during cage loading operations at the bottom of the shaft or a low-level bank the weight of the loaded cars or other load frequently causes the cage to sink gradually to a level substantially below the prescribed banking level. It has therefore been necessary to use movable bridge structures which are usually pivoted at their one end to the bank and rest at their other end on the cage floor, and such bridge structures must be made long enough to provide an acceptable low-grade incline to permit loading operations in the depressed condition of the cage.

In an attempt to reduce the necessary length of such bridges, cage levelling systems have been devised which act to compensate for the stretching of the ropes by causing the hoisting engine to impart compensatory rotations to the winding pulley at the pit-head. However, because such prior art devices have utilized the massive winding machinery for correcting the relatively small positional variations of the cage, the response times were inordinately long and did not permit of accurately and continually correcting such variations.

It is an object of this invention to provide improved means for correcting positional displacements of a pit-cage due to rope stretch, which will be extremely efficient due to their short response time, and simple and economical to construct and operate. A consequent object is to make it possible to retain a pit-cage accurately at a prescribed banking level in a deep mine shaft despite the tendency of the ropes to stretch under load, and thereby to make it possible to conduct loading and other banking operations at great depths without or substantially without the use of movable bridges.

The invention for this purpose provides an arrangement in a mine hoisting system having a pit cage attached to a rope and a pit-head pulley and hoisting engine for operating said rope up and down the pit, which arrangement comprises means for braking said pulley to hold the cage at a prescribed pit level, means sensing minor displacements of said cage from said level due to variations in rope length, and actuator means separate and distinct from said hoisting engine and operated from said sensing means for imparting to said pulley in the braked condition thereof compensatory angular movements to oppose such displacements.

The invention also provides an arrangement in a mine hoisting system having a pit cage attached to a rope and a pit-head pulley for operating said rope, which arrangement comprises main brake means engageable with said pulley to hold the cage at a prescribed pit level, auxiliary brake means engageable with the pulley and mounted for limited angular displacements bodily with and coaxially with the pulley in the engaged condition of said auxiliary brake means, senser means positioned at said level for sensing minor displacements of the cage relative thereto, and actuator means operated from said senser means for imparting to said auxiliary brake means and pulley in the engaged condition thereof compensatory angular movements to oppose such displacements.

In the operation of the hoisting system, automatic control means are provided which are responsive to the engagement of the main brake means on attainment by the cage of a prescribed banking level for thereafter engaging the auxiliary brake means and disengaging the main brake means, whereafter the arrangement will operate to maintain the cage accurately and continuously at the desired level, throughout banking operations.

Figure 2:
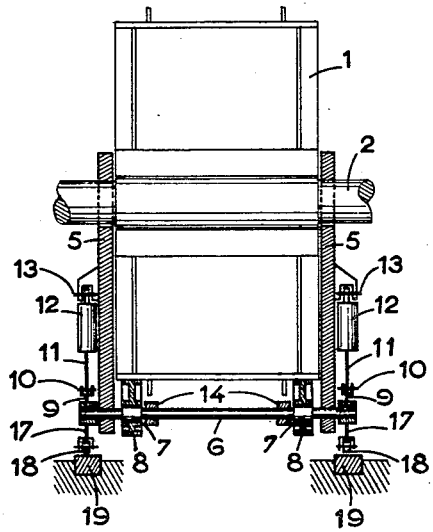
Figure 3:
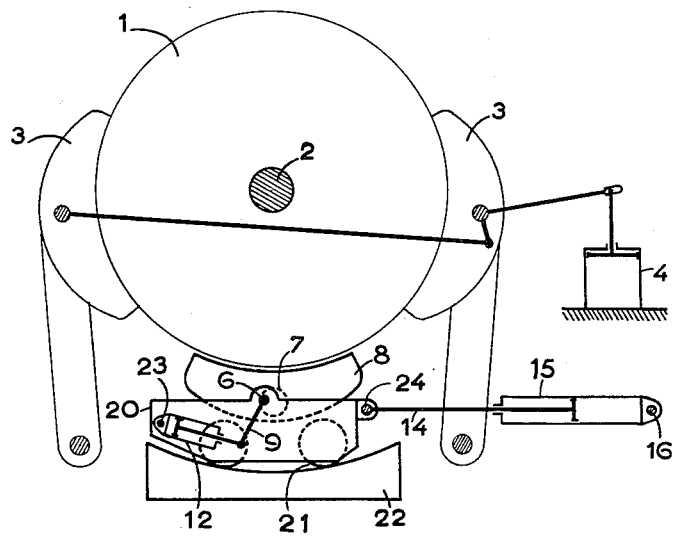
Figure 4:
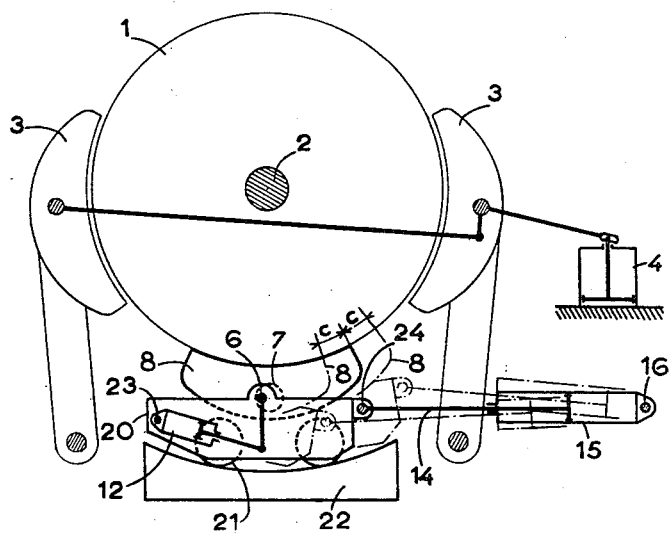
Figure 5:
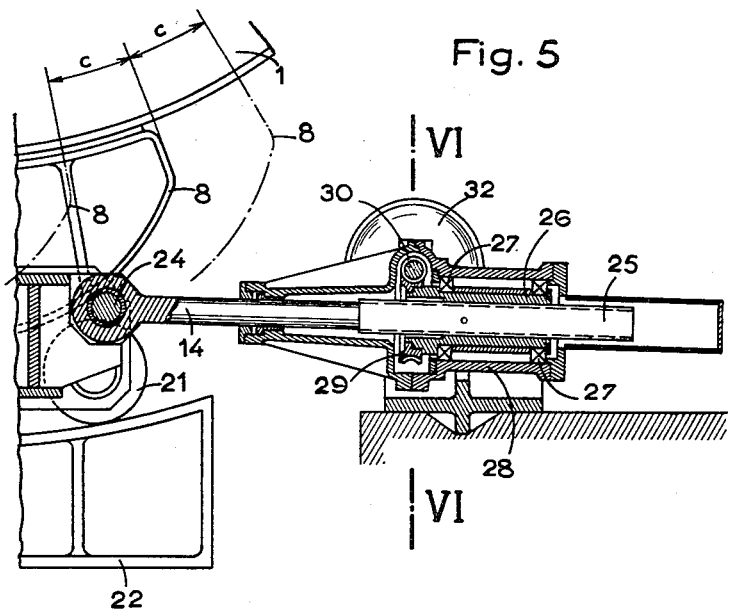
Figure 6:
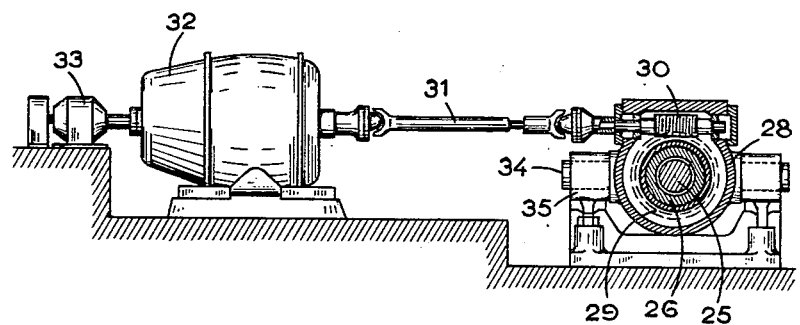
Figure 7:
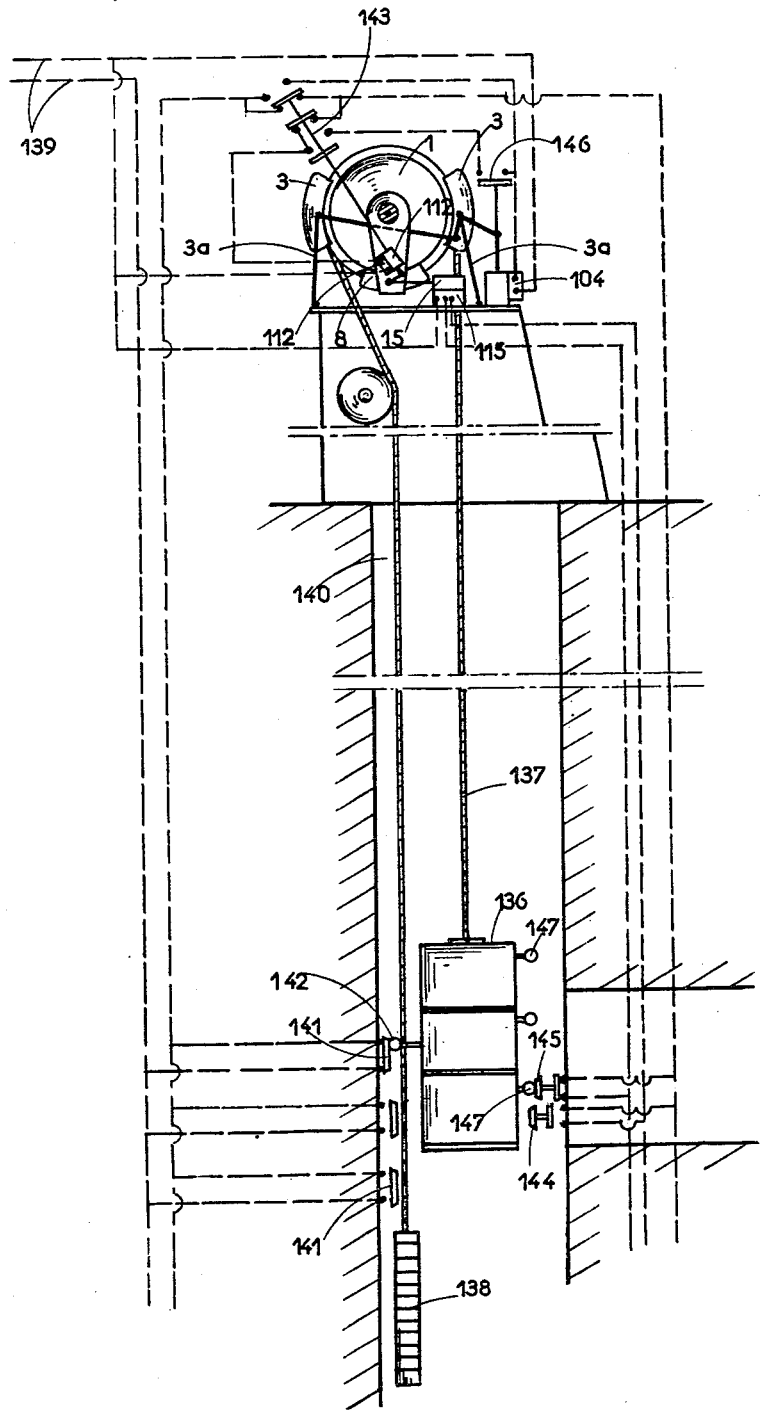

Exemplary embodiments of the invention will now be described for purposes of illustration but not of limitation with reference to the accompanying drawings, wherein:

FIG. 1 is a schematic view in elevation showing a first embodiment;
FIG. 2 is a sectional view on line II—II of FIG. 1;
FIG. 3 is a view similar to FIG. 1 but illustrating a modified form of the invention;
FIG. 4 is similar to FIG. 3 but shows the system in a different operating condition;
FIG. 5 is a more detailed view, in elevation and partly in vertical section, illustrating one construction of an actuator drive operated by an electric motor;
FIG. 6 is a view of the same embodiment as in FIG. 5 as seen at right angles thereto and partly in section on line VI—VI of FIG. 5; and
FIG. 7 is a schematic representation of a general view of the entire elevator installation including the mine hoist, the pit cage, the cables and a simplified electric circuit controlling the actuation of the installation.

Referring to the drawings, in all figures of which like numerals designate like parts, there is shown a winding pulley 1 carried by a shaft 2 and fitted with a main service brake of conventional type which may comprise as shown the diametrically opposed brake shoes 3 engageable with the periphery of the rim of pulley 1 under control of a pressure-air actuator 4. The braking reactions are transmitted to the fixed base of the installation by two articulated levers 3a.

Rotatably supported on shaft 2 on opposite sides of pulley 1 are the upper ends of a pair of depending arms 5 having a shaft 6 journalled across their lower ends. Secured on shaft 2 inward of the arms 5 are a pair of eccentric members 7 which are rotatable in respective auxiliary brake shoes 8 engageable with the bottom of the pulley periphery as shown. The shaft 6 further has secured thereon beyond the arms 5 a pair of links 9 which have their opposite ends pivoted at 10 to the piston rods 11 of respective pressure-air actuators including the cylinders 12, which cylinders have their upper ends pivoted at 13 to brackets secured to the outer sides of the respectively related arms 5 intermediate the length of the latter.

Pivotally attached to shaft 14 inward of the eccenter members 7 are the spaced legs of a fork formed at the end of a piston rod 14, reciprocable in a pressure-fluid actuator cylinder 15 having its remote end pivoted at 16 to stationary structure. Further, the outer ends of shaft 6 have secured thereto, in addition to the afore-mentioned links 9 the further links 17 which have rollers 18 journalled on their lower ends. The rollers 18 are in engagement with a stationary runway 19 imbedded in the base of the structure and having an arcuate runway surface coaxial with the pulley 1 as will be apparent from FIG. 1.

It will be understood that the auxiliary brake comprising the brakeshoes 8 is adapted when engaged to impart to the pulley 1 limited angular displacements of amplitude c (see FIG. 1) to either side from its centered position shown in full lines. Thus, in the position shown in FIG. 1, the main service brake comprising brakeshoes 3 is released, while the auxiliary brakeshoes 3 are applied against the rim of pulley 1 by the action of air actuators 12, whereupon operation of actuator 15 will impart said bodily angular movement to brakeshoes 8 and pulley 1.

The operation of the service brake 3 is controlled in the conventional manner, in response to engagement of the cage with pit contacts adjacent the landing position, which through conventional circuitry control the main brake actuator 4. According to the invention, automatic means are provided which are operative, on engagement of the main brake 3, delayedly to engage the auxiliary brake 8, and then to release the main brake 3 on full engagement of the auxiliary brake. The said automatic means may comprise any suitable electric circuitry including conventional delay means for operating the auxiliary brake actuators 12 under control of contacts mechanically operated by the main brake actuator linkage. With the main brake 3 released and auxiliary brake 8 applied, further means according to the invention become operative to act on the rocking actuator 15 in response to fluctuations in cage position from the prescribed banking level so as to impart to pulley 1 by way of auxiliary brakeshoes 8, rocking movements about the pulley shaft 2 for at all times substantially compensating for such positional fluctuations of the cage as may be due to rope stretch. For this purpose, any suitable positonal sensor may be provided at the pit level under consideration for sensing minor cage departures from said level, and associated servo-mechanism for operating actuator 15 in accordance with the senser output signal, so as to maintain said signal at a predetermined reference value, e.g. zero, and thereby hold the cage substantially at its constant desired vertical position.

Cage loading and unloading operations are thereby greatly facilitated.

When the cage is to be displaced for a fresh trip, or for positioning a different platform of the cage at the banking level, the usual signal that is transmitted for the purpose first acts on auxiliary brake actuators 12 to release the brakes 8 and acts on rocking actuator 15 for thereafter restoring the auxiliary brakeshoes 8 to their centred positions, whereby the cycle of operations can be repeated when next required.

As seen in the assembly of FIG. 7, cage 136 is suspended at one of the ends of a cable 137 rolled on reel 1. The other end of cable 137 supports either a second cage or, as shown, a counterweight 138. It is to be understood that the expression "cable" may include a plurality of cables each being rolled in a separate groove in reel 1.

The three actuators 4, 12 and 15 are controlled, respectively, by electrically actuated valves 104, 112, and 115, which are connected into the control circuit 139.

At each level of the shaft 140, shaft contacts 141 are provided; are suitably spaced; and are here shown as three in number since cage 136 has three levels. Each of the shaft contacts is closed selectively for the level of the cage being used and is closed by a member 142 mounted on cage 136.

The shaft contacts 141 for the different levels of the cage are connected to a switch 143 actuated by the piston rod of actuator 12 of auxiliary brake 8. Switch 143 is connected to the electrically actuated valve 104 of actuator 4 of the main brake. It is also connected to electrically actuated valve 112 of actuator 12 of the auxiliary brake 8 and it is also connected to out-of-level detectors which are arranged at each of the levels and here shown as spaced contacts 144 and 145.

A switch 146 is actuated by the piston rod of actuator 4 of main brake 3 and switch 146 is connected to switch 143.

Contacts 144 and 145 of the detectors for leveling the cage are controlled by push members 147 mounted on cage 136 and spaced apart corresponding to the levels of the cage.

Contacts 144 and 145 are connected to electrically actuated valve 115 of actuator 15 for leveling the cage.

With the device in the position shown in FIGS. 1 and 7, the upper shaft contact 141 is closed by member 142 on the cage and is connected through switch 143 to electrically actuated valve 112 of the auxiliary brake which is then actuated to braking position. Contact 145 of the leveling detector is connected to electrically actuated valve 115. Electrically actuated valve 104 of the main brake is not energized and this brake is de-actuated.

If the cage level corresponding to shaft contact 141 is not at its proper level, member 147 which corresponds to this level of the cage closes one or the other of the two contacts 144 and 145. Electrically actuated valve 115 is then opened in the desired direction to energize actuator 15 in the proper direction to level the cage. As soon as this is accomplished, actuator 15 is de-energized because of the simultaneous opening of the two contacts 144 and 145 and auxiliary brake 8 retains the cage in leveled position. Any further leveling of the cage causes actuator 15 to move in the proper direction.

For the next movement of the cage either from one level of the mine to another or to place another level of the cage at the mine level, the connection of shaft contact 141 is broken, for example, by the signal actuating the apparatus, and the shaft contact 141 corresponding to the desired stop is closed pre-selectively by the movement of the cage.

At this moment the electrically actuated valves 112 and 115 are closed and the auxiliary brake is released and actuator 15 returns to its normal position.

The return of actuator 12 to its normal position moves switch 143 which takes the position for which electrically actuated valve 115 of main brake 3 will be connected to the shaft contacts corresponding to the desired stop and will be closed by member 142 on the cage. When the main brake is actuated switch 146 is closed and connects through switch 143 to electrically actuated valve 112 of auxiliary brake 8. Auxiliary brake 8 is actuated. Switch 143 interrupts the action of the main brake and connects contacts 144 and 145 of the leveling detector into the circuit.

The electric controlled circuit of FIG. 7 is shown in a simplified form and could include accessory devices, such as relays for controlling the correct succession of the different operations. The control circuit can be arranged in various ways as would be apparent to one skilled in the art.

It will be noted that in the normal condition where auxiliary brake 8 is released, the rollers 18 engage the runway members 19 to exert an upward force on the levers 5. This results in distributing the clearance such as $e$ initially provided between the pulley shaft 2 and the cooperating bores of levers 5 uniformly all around the shaft periphery, whereby the pulley shaft will not be subjected to any substantial amount of friction from the arms 5 during hoisting operation of the cage.

The embodiment illustrated in FIGS. 3 and 4 differs from the one just described mainly in the means for supporting the auxiliary brake shoes 8. As here shown, the brake shoes 8 are mounted on supports 20 mounted on rollers 21 which engage stationary runways 22 having arcuate surface coaxial with the pulley 1. The auxiliary brake actuators 12 are in this case pivoted at 23 to the supports 20 and the actuator rods 9 operate the shoes 8 between their applied and released positions through eccenter members 7 as in the first embodiment. The rocking actuator 15 acts by way of rod 14 pivoted to a crossbar 24 interconnecting both supports 20. The operation of this embodiment will be evident from what was earlier described.

While the rocking actuator 15 has so far been shown as a fluid-operated (e.g. hydraulic) actuator, it will be evident that it may assume the form of any motor device, e.g. an electric motor and suitable mechanical drive. One such construction is shown by way of example in FIGS. 5 and 6, in which the auxiliary brake shoe construction is assumed to be similar to that of FIGS. 3 and 4 though clearly the construction of FIGS. 1 and 2 may alternatively here be used. Referring to FIGS. 5 and 6, the rocker rod 14 has its front end pivoted to a crossbar 24 interconnecting the auxiliary brakeshoe supports 20 as previously described, and has its rear section screw-threaded at 25 and engaging a nut member 26 which is rotatably mounted by way of ball or roller thrust bearings 27 in a casing 28. Secured to nut 26 coaxially with it is a wormgear 29 which meshes with a worm 30. Worm 30 is driven through a Cardan drive 31 from electric motor 32. The casing 28 is shown mounted for limited rocking movement on its base by way of trunnions 34 projecting from the sides of the casing and rotatable in bearings 35 of the base. FIG. 6 further illustrates at 33 a follow-up generator connected with the drive shaft of motor 32 for providing an electric signal corresponding to the position (and/or rate of displacement) of the motor shaft and hence of the auxiliary brake shoes 8 to provide the necessary feedback action for the servo-system as will be clear to those familiar with the servo art.

What I claim is:

1. In a mine hoisting system including a pit cage attached to a rope and a pithead pulley for operating said rope, main brake means engageable with said pulley to hold said cage at a prescribed pit level, auxiliary brake means engageable with said pulley and means mounting said auxiliary brake means for limited angular displacements bodily and coaxially with the pulley in the engaged condition of said auxiliary brake means, senser means positioned at said level for sensing minor displacements of said cage relative thereto, and actuator means connected with said senser means and said auxiliary brake means for imparting to said pulley compensatory angular displacements to maintain said cage substantially at said prescribed level.

2. In a mine hoisting system including a pit cage attached to a rope and a pithead pulley rotatable for operating said rope: main brake means engageable with said pulley and first actuator means operable for engaging and disengaging said main brake means; auxiliary brake means engageable with said pulley and second actuator means operable for engaging and disengaging said auxiliary brake means; means mounting the auxiliary brake means for limited rocking movement coaxially with and bodily with said pulley in the engaged condition of the auxiliary brake means; third actuator means operable for imparting limited rocking movements to said auxiliary brake means and pulley; senser means positioned at a prescribed pit level for sensing minor displacements of the cage about said level; and servomechanism connected for operation by said senser means and connected to operate said third actuator to oppose said minor displacements.

3. The combination claimed in claim 2, further including control means connected with said first and second actuator means and responsive to the engagement of said main brake means for thereafter operating said second actuator means to engage said auxiliary brake means and disengage said main brake means.

4. The combination claimed in claim 2, wherein said auxiliary brake means comprise at least one brake shoe and said mounting means comprise an arm pivoted coaxially with said pulley and supporting said brake shoe at an end thereof for radial displacement by said second actuator means and for angular displacement by said third actuator means.

5. The combination claimed in claim 2, wherein said auxiliary brake means comprise at least one brake shoe and said mounting means comprise a depending arm pivoted coaxially with said pulley and supporting said brake shoe at the lower end thereof for radial displacement by said second actuator means and for angular displacement by said third actuator means runway, means positioned under said brake shoe and having an arcuate runway surface coaxial with said pulley, and roller means depending from said brake shoe and engageable with said runway surface in the disengaged condition of said brake shoe.

6. The combination claimed in claim 2, wherein said auxiliary brake means comprise at least one brake shoe and said mounting means comprise a stationary runway positioned under said brake shoe and having an arcuate runway surface coaxial with said pulley, a support mounted on rollers on said runway and supporting said brake shoe for radial displacement relative to said pulley by said second actuator means, and means connecting said third actuator means with said support for angular displacement of said support and brake shoe relative to said pulley by said third actuator means.

7. The combination claimed in claim 2, wherein said third actuator means comprise a fluid-operated actuator.

8. The combination claimed in claim 2, wherein said third actuator means comprise an electric motor and reducer drive.

References Cited in the file of this patent

UNITED STATES PATENTS

| 1,268,111 | Furlow | June 4, 1918 |
| 1,796,281 | Baruch | Mar. 17, 1931 |
| 2,433,003 | Swennes | Dec. 29, 1947 |